(12) United States Patent
Zeng et al.

(10) Patent No.: US 10,785,983 B2
(45) Date of Patent: Sep. 29, 2020

(54) METHOD FOR PRODUCING INTENSIFIED WHOLE-CEREAL FLOUR BY MEANS OF PULSED ELECTRIC FIELDS IN COLLABORATION WITH ULTRAFINE PULVERIZATION

(71) Applicant: South China University of Technology, Guangzhou (CN)

(72) Inventors: Xin'an Zeng, Guangzhou (CN); Jing Hong, Guangzhou (CN); Zhong Han, Guangzhou (CN); Zhiwei Liu, Guangzhou (CN)

(73) Assignee: South China University of Technology (CN)

( * ) Notice: Subject to any disclaimer, the term of this patent is extended or adjusted under 35 U.S.C. 154(b) by 234 days.

(21) Appl. No.: 15/755,162

(22) PCT Filed: Dec. 29, 2015

(86) PCT No.: PCT/CN2015/099640
§ 371 (c)(1),
(2) Date: Feb. 26, 2018

(87) PCT Pub. No.: WO2017/036036
PCT Pub. Date: Mar. 9, 2017

(65) Prior Publication Data
US 2018/0242597 A1   Aug. 30, 2018

(30) Foreign Application Priority Data

Aug. 28, 2015  (CN) .......................... 2015 1 0547007

(51) Int. Cl.
*A21D 6/00* (2006.01)
*A21D 2/18* (2006.01)
(Continued)

(52) U.S. Cl.
CPC ............... *A21D 6/00* (2013.01); *A21D 2/181* (2013.01); *A21D 2/183* (2013.01); *A21D 6/005* (2013.01);
(Continued)

(58) Field of Classification Search
CPC ... A23L 3/26; A23L 3/32; A23L 3/325; A23L 5/15; A23L 5/30; A23L 7/10;
(Continued)

(56) References Cited

U.S. PATENT DOCUMENTS 4,208,259 A * 6/1980 Oughton .................. A23J 1/12
204/560
5,447,733 A * 9/1995 Bushnell ................... A23L 3/32
426/237
(Continued)

FOREIGN PATENT DOCUMENTS

CN        1905797 A       1/2007
CN      101253954 A       9/2008
(Continued)

OTHER PUBLICATIONS

CN101293966B translation, original document published Oct. 29, 2008 (Year: 2008).*
(Continued)

*Primary Examiner* — Drew E Becker
*Assistant Examiner* — Bryan Kim
(74) *Attorney, Agent, or Firm* — The Webb Law Firm

(57) ABSTRACT

A method is provided for producing intensified whole-cereal flour by means of pulsed electric fields in collaboration with ultrafine pulverization, which includes: (1) preparing bran, middling and flour by cleaning, modulating and milling cereal grains; (2) performing superfine pulverization on the bran and the middling and performing sieving; (3) preparing a suspension by using water and the sieved bran and (Continued)

middling, and stirring constantly; (4) adding polysaccharide colloids into the suspension, and adjusting the pH to 4.0; (5) performing high-voltage pulse treatment on the suspension to ensure stable flow of the suspension; (6) centrifuging the suspension to separate the supernatant, and drying the obtained precipitate and performing sieving to obtain the treated bran and middling; and (7) mixing the treated bran and middling with flour uniformly to obtain whole-cereal flour.

10 Claims, 2 Drawing Sheets

(51) Int. Cl.
| | | |
|---|---|---|
| A23L 5/30 | (2016.01) | |
| A23L 7/10 | (2016.01) | |
| B02B 5/02 | (2006.01) | |
| A21D 13/02 | (2006.01) | |

(52) U.S. Cl.
CPC .............. *A21D 13/02* (2013.01); *A23L 5/30* (2016.08); *A23L 7/10* (2016.08); *A23L 7/198* (2016.08); *B02B 5/02* (2013.01)

(58) Field of Classification Search
CPC .......... A23L 7/115; A23L 7/198; A23L 3/005; A23L 3/01; A23L 3/263; A23L 3/266; A23L 3/3463; A23L 3/3562; A23L 5/36; A23L 7/152; A23L 7/197; A21D 2/181; A21D 2/183; A21D 2/186; A21D 2/188; A21D 6/00; A21D 6/005; A21D 2/40; A21D 6/003; A21D 2/18; A21D 2/22; A21D 13/02; A23V 2002/00; A23V 2300/12
USPC ...................................... 241/6–13
See application file for complete search history.

(56) References Cited

U.S. PATENT DOCUMENTS

| | | | | |
|---|---|---|---|---|
| 6,372,281 | B1 * | 4/2002 | Metzger ................... | B02C 9/04 |
| | | | | 426/463 |
| 7,419,694 | B2 * | 9/2008 | Korolchuk ............... | B02C 9/04 |
| | | | | 426/462 |
| 8,029,843 | B2 * | 10/2011 | Bohm ............ | C12Y 302/01032 |
| | | | | 426/459 |
| 8,361,532 | B2 * | 1/2013 | David .................... | A21D 13/40 |
| | | | | 426/622 |
| 8,586,113 | B2 | 11/2013 | Carder et al. | |
| 8,852,666 | B2 * | 10/2014 | Heittiarachchy ....... | A23L 33/15 |
| | | | | 426/656 |
| 10,021,882 | B1 * | 7/2018 | Liu ........................ | A23K 10/30 |
| 2005/0136174 | A1 | 6/2005 | Korolchuk et al. | |
| 2007/0104855 | A1 * | 5/2007 | Arndt ....................... | A21D 6/00 |
| | | | | 426/622 |
| 2007/0104988 | A1 | 5/2007 | Nishii et al. | |
| 2008/0311637 | A1 * | 12/2008 | Navapanich ........... | C12M 21/12 |
| | | | | 435/161 |
| 2008/0311639 | A1 * | 12/2008 | Navapanich ........... | C12M 21/12 |
| | | | | 435/165 |
| 2014/0242220 | A1 * | 8/2014 | Chen ...................... | A23L 33/22 |
| | | | | 426/71 |
| 2016/0251670 | A1 * | 9/2016 | Jobling .................... | A23L 7/10 |
| | | | | 800/284 |

FOREIGN PATENT DOCUMENTS

| | | | | | |
|---|---|---|---|---|---|
| CN | 101356959 | A | | 2/2009 | |
| CN | 101584421 | A | | 11/2009 | |
| CN | 101293966 | B | * | 12/2010 | ............... C08J 3/12 |
| CN | 101301004 | B | * | 12/2010 | ............... A23B 9/06 |
| CN | 101999585 | A | | 4/2011 | |
| CN | 102150840 | A | | 8/2011 | |
| CN | 102524670 | A | | 7/2012 | |
| CN | 102805292 | A | | 12/2012 | |
| CN | 102438458 | B | | 3/2014 | |
| CN | 103750140 | A | | 4/2014 | |
| CN | 104304988 | A | | 1/2015 | |
| CN | 105076977 | A | | 11/2015 | |
| WO | WO-9525442 | A1 | * | 9/1995 | ............. A23L 3/266 |
| WO | WO-2016097328 | A1 | * | 6/2016 | ............. A23P 30/20 |

OTHER PUBLICATIONS

Zhong et al. "Effects of pulsed electric fields (PEF) treatment on the properties of corn starch", published Feb. 11, 2009, https://www.sciencedirect.com/science/article/pii/S0260877409000570 (Year: 2009).*

Hua; "A Study on Maillard Reaction in Bovine Serum Albumin and Dextran System: A Dissertation Submitted for the Degree of Master"; May 2010; South China University of Technology; Guangzhou, China; English-language Abstract attached.

Li et al.; "Effects of High Power Pulsed Electric Field on Hydrophobicity and Sulfhydry Groups Content of Soybean Protein Isolated"; Food Science; 2006; pp. 40-43; vol. 27:5; English-language Abstract attached.

Wang et al.; "Influence of different UHP processing times on properties of wheat bran"; Cereal and Feed Industry; 2011; pp. 28, 29, and 33; vol. 1; English-language Abstract attached.

Zhao et al.; "Changes in Functional Properties and Structure of Egg White Proteins Induced by Pulsed Electric Fields"; Food Science; 2011; pp. 94-95; vol. 32:9; English-language Abstract attached.

* cited by examiner

METHOD FOR PRODUCING INTENSIFIED WHOLE-CEREAL FLOUR BY MEANS OF PULSED ELECTRIC FIELDS IN COLLABORATION WITH ULTRAFINE PULVERIZATION

CROSS-REFERENCE TO RELATED APPLICATIONS

The application is the United States national phase of International Application No. PCT/CN2015/099640 filed Dec. 29, 2015, and claims priority to Chinese Patent Application No. 201510547007.X filed Aug. 28, 2015, the disclosures of which are hereby incorporated in their entirety by reference.

BACKGROUND OF THE INVENTION

Field of the Invention

The present invention relates to a method for treating whole-cereal flour, and in particular to a method for producing intensified whole-cereal flour by means of pulsed electric fields in collaboration with ultrafine pulverization.

Description of Related Art

Whole-cereal flour refers to all edible portions of various cereals such as wheat, corn, rice, oats, barley, beans and the like. Whole-cereal flour is composed of three parts including cortex, endosperm and germ. In order to obtain bran and middling flour, cortex and germ are often milled off in producing refined cereal. Bran is the coarse outer layer of whole cereal, containing large amounts of minerals and cellulose, unsaturated fatty acids, B vitamins, antioxidants, plant nutrients and other active ingredients in the cereal, with its nutritional effectiveness unignorable. Middling contains a lot of protein, but the protein has poor ductility and viscoelasticity. If the subdivided protein is modified and then applied, not only the protein content of the product but also the value of the whole-cereal flour can be increased. Besides, due to high dietary fiber, low fat, low saturated fatty acids, low cholesterol and low calorie, the whole-cereal foods have some health care functions. It is found through study that calcium, magnesium, zinc, potassium, selenium and other minerals and vitamins contained in whole wheat grains have the role of promoting human growth and development; dietary fiber can improve digestion, lower cholesterol and blood glucose, improve blood lipid metabolism, reduce the risk of type II diabetes, and reduce the risk of heart failure; and insoluble fiber can promote intestinal peristalsis and reduce obesity. As for the whole-cereal flour, finding the best balance between taste, and nutrition and safety, and meanwhile obtaining higher economic and social benefits has become the focus of research and exploration.

At present, the commercial whole-cereal flour is generally obtained by adding bran and germ in a specific proportion back to the special flour. Pulverizing whole grain is another way to obtain small amount of whole-cereal flour. The technology of transforming the direct production of whole-cereal flour or semi-cereal flour in an existing flourmill is also being studied. At present the following methods of producing the whole-cereal flour have been disclosed: Chinese invention patent CN 102438458 B discloses a method of preparing highly dispersible whole-cereal flour, wherein α-amylase is used to hydrolyze the whole-cereal flour, then enzyme is inactivated by being heated and pressurized with a cooking extruder, and pills at the outlet of the extruder are finely milled to obtain the products; Chinese invention patent application 200710138585.3 discloses a method of ultrafinely pulverizing whole-wheat flour, wherein the ultrafinely pulverized flour is sterilized by means of ultraviolet rays and high-frequency microwaves, and then measured and packed to obtain the finished products; Chinese invention patent application 201210326478.4 discloses a method of stabilizing the bran, wherein wheat is used as the raw material, which is treated by hot steam and then dried by UV microwave to obtain the finished products; in the preparation process of the whole-wheat flour disclosed in the invention patents CN101253954A and CN102150840A, the bran is extruded and de-enzymatically treated before flour blending; Chinese invention patent application 201410007683.3 discloses a method of using steam explosion technology to produce whole-wheat flour, wherein the wheat grains are directly pressurized and heated, and the pressure-relieved grains are further pulverized to obtain the whole-wheat flour.

These methods have the following disadvantages:

1) The enzyme degradation method has high costs and complex fermentation process conditions;

2) high temperature, high pressure and extrusion cause damage of protein, decreased gluten power, partially gelatinized starch and limited application of products, and high temperature causes browning reaction, resulting in darker bran speck color and poor color of the whole-cereal flour;

3) microwave radiation drying or sterilization is an intermittent operation, not conducive to continuous production; and 4) preparation of whole-wheat flour by UV irradiation is very demanding on the equipment, and may produce harmful substances that are not conducive to eating.

SUMMARY OF THE INVENTION

In order to overcome the above-mentioned shortcomings and deficiencies of the prior art, a purpose of the present invention is to provide a method for producing intensified whole-cereal flour by means of pulsed electric fields in collaboration with ultrafine pulverization, which adopts the non-heat treatment technology in the process to reduce the destruction of protein and starch. The obtained whole-cereal flour has high thermal stability, safety, comprehensive nutrition, bright color, good palatability and high application value. Besides that, the process is simple and easy to implement.

The purpose of the present invention is achieved by the following technical solution:

A method for producing intensified whole-cereal flour by means of pulsed electric fields in collaboration with ultrafine pulverization comprises the following steps:

(1) Preparing bran, middling and flour by cleaning, modulating and milling cereal grains;

(2) performing superfine pulverization on the bran and the middling and performing sieving for standby use;

(3) preparing a 20-30% suspension by using water and the sieved bran and middling, and stirring constantly to keep the suspension uniform;

(4) adding polysaccharide colloids into the suspension, and adjusting the pH to 4.0-5.5, with the polysaccharide colloids added in an amount of 0.2-0.5‰ of the mass of the suspension;

(5) placing the suspension obtained in the step (4) into a processing chamber of the cleaned high-voltage pulse processing device for high-voltage pulse treatment to ensure stable flow of the suspension;

(6) centrifuging the suspension after the step (5) to separate a supernatant, and drying the resulting precipitates at 30-37° C. to a moisture content below 14% and performing sieving to obtain treated bran and middling; and (7) mixing the treated bran and middling obtained in the step (6) with the flour obtained in the step (1) to obtain the whole-cereal flour.

The polysaccharide colloids in the step (4) are gum acacia, konjac gum, carrageenan, xanthan gum or pectin.

The specific parameters of the high-voltage pulse treatment in the step (5) are as follows: The pulse frequency is 500-1500 Hz, the pulse width is 20-40 μs, the flow rate is 300-600 L/h, the electric field intensity is 10-50 kV/cm, and the pulse treatment time is 70-550 μs.

The cleaning mentioned in the step (1) includes sieving, removing stone, magnetic separation, winnowing and threshing.

The sieving in the step (2) is performed by a 60-mesh sieve.

The sieving in the step (6) is performed by a 80-mesh sieve.

The centrifugation in the step (6) is specifically centrifugating for 5-15 min at 3000-5000 r/min.

The present invention has the following advantages and benefits compared to the prior art:

(1) The present invention can obviously improve the rough taste of the whole-cereal flour, prolong the shelf life and the storage stability of the whole-cereal flour, and improve the thermal stability of the whole-wheat flour while reduce the damage of the starch content.

(2) The pulsed electric field effect of the present invention is effective to promote the opening of amino acid side chains and facilitate the access of polysaccharide molecules, thus increasing the protein gluten power, ductility and viscoelasticity of the whole-cereal flour, thereby increasing the application range and improving the quality of whole-cereal products. Experiments show that the steamed bun made of whole-cereal flour treated by the present invention has lower roughness taste, higher viscoelasticity and chewiness, and a higher height-diameter ratio; while the untreated whole-cereal flour has poorer palatability and viscoelasticity and lower height-diameter ratio under the same conditions; the bread made of the treated whole-cereal flour has uniform gaps and good taste and is not easy to aging; and the noodle made of the treated whole-cereal flour has a significantly reduced broken rate, higher toughness, and a decreased cooking loss rate. Meanwhile, the pulsed electric field can effectively passivate enzymes, and maximize the preservation of the original flavor, color, taste and nutritional value of food.

(3) The present invention has the advantages of simple operation, short treatment time, low energy consumption, and simple and feasible methods.

DETAILED DESCRIPTION OF THE EMBODIMENTS

The present invention will be further described below in detail with reference to examples; however, the embodiments of the present invention are not limited thereto.

EXAMPLE 1

Figure 1:
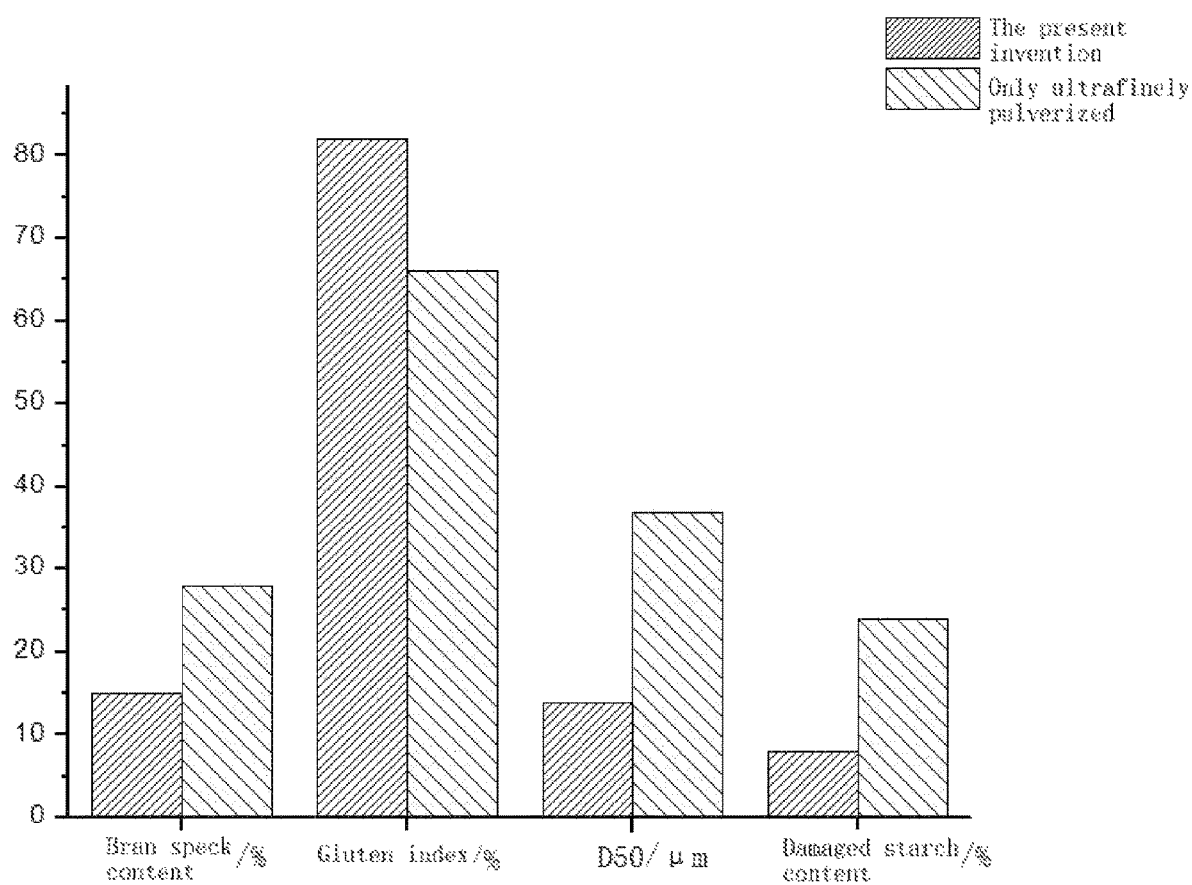
FIG. 1 is a comparison of physical and chemical indexes between the whole-wheat flour obtained by an example of the present invention and the whole-wheat flour subjected only to superfine pulverization.

Milling as above wheat (hard wheat) grains to obtain bran, middling and flour, ultrafinely pulverizing the bran and middling and sieving with a 60-mesh sieve to formulate into a 20% suspension, and using a stirring machine to keep the suspension uniform. Adding 0.2% c pectin to the suspension, and adjusting the pH to 4.0 before placing the suspension in the cleaned processing chamber of the pulsed electric field processing device; ensuring stable flow of the suspension to be treated, and setting the pulsed electric field parameters as follows: the pulse width is 40 μs, the flow rate is 300 L/h, the pulse frequency is 1500 Hz, the electric field intensity is 50 kV/cm, and the treatment time is 70 μs. Centrifugating the treated bran and middling suspension at 5000 r/min for 15 min to remove the supernatant; drying the precipitates at 30° C. to a moisture content below 14%, milling and sieving with a 80-mesh sieve, and mixing uniformly with flour in a mixing machine to obtain whole-wheat flour, which has a bran speck content of 15%, a particle size distribution D50 (μm) of 13.92, a gluten index of 82, and a damaged starch content of 8%. Wherein the whole-wheat flour only ultrafinely pulverized has a bran speck content of 28%, a particle size distribution D50 of 36.88, a gluten index of 66, and a damaged starch content of 24%. The comparison of data is shown in FIG. 1.

Figure 2:
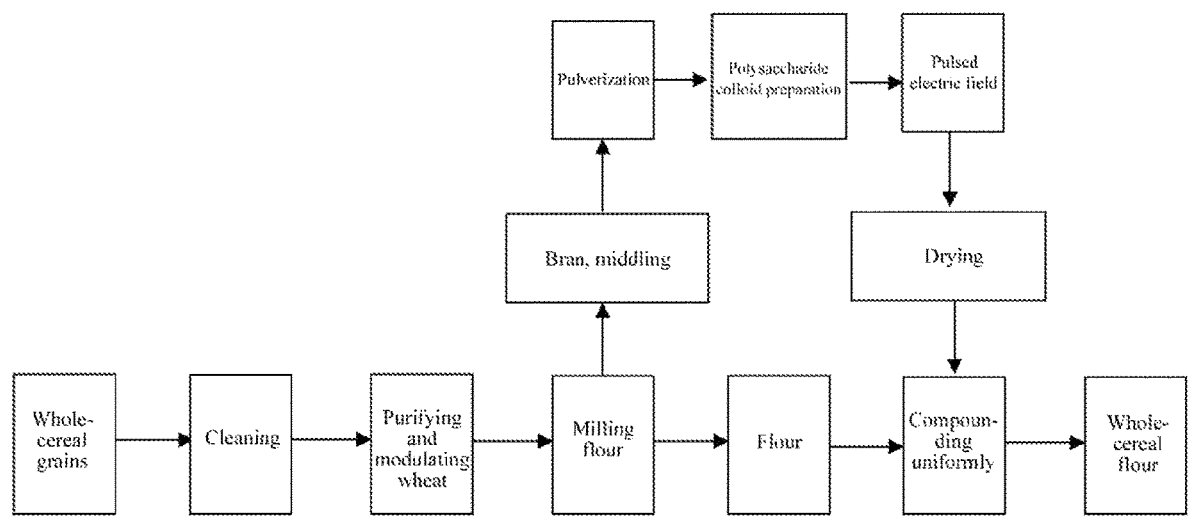
FIG. 2 is a flow chart of the method for producing intensified whole-cereal flour by means of pulsed electric fields in collaboration with ultrafine pulverization according to the example of the present invention.

The flow chart of the method for producing intensified whole-cereal flour by means of pulsed electric fields in collaboration with ultrafine pulverization according to this example of the present invention is as shown in FIG. 2.

EXAMPLE 2

Milling as above wheat (medium quality wheat) grains to obtain bran, middling and flour, ultrafinely pulverizing the bran and middling and sieving with a 60-mesh sieve to formulate into a 25% suspension, and using a stirring machine to keep the suspension uniform. Adding 0.4‰ carrageenan to the suspension, and adjusting the pH to 4.5 before placing the suspension in the cleaned processing chamber of the pulsed electric field processing device; ensuring stable flow of the suspension to be treated, and setting the pulsed electric field parameters as follows: the pulse width is 40 μs, the flow rate is 600 L/h, when the pulse frequency is 1000 Hz, the electric field intensity is 30 kV/cm, and the treatment time is 500 μs. Centrifugating the treated bran and middling suspension at 3000 r/min for 10 min to remove the supernatant, drying the precipitates at 37° C. to a moisture content below 14% milling and sieving with a 80-mesh sieve, and mixing uniformly with flour in a mixing machine to obtain whole-wheat flour, which has a bran speck content of is 12%, a particle size distribution D50 (μm) of 15.04, a gluten index of 74, and a damaged starch content of 9%. Wherein the whole-wheat flour only ultrafinely pulverized has a bran speck content of 25%, a particle size distribution D50 of 30.12, a gluten index of 62, and a damaged starch content of 21%. The comparison of data is shown in FIG. 1.

EXAMPLE 3

Milling as above wheat (soft wheat) grains to obtain bran, middling and flour, ultrafinely pulverizing the bran and middling and sieving with a 60-mesh sieve to formulate into a 30% suspension, and using a stirring machine to keep the suspension uniform. Adding 0.5% c konjac gum to the suspension, and adjusting the pH to 5.5 before placing the suspension in the cleaned processing chamber of the pulsed electric field processing device; ensuring stable flow of the suspension to be treated, and setting the pulsed electric field parameters as follows: the pulse width is 40 µs, the flow rate is 300 L/h, when the pulse frequency is 500 Hz, the electric field intensity is 10 kV/cm, and the treatment time is 450 µs. Centrifuging the treated bran and middling suspension at 5000 r/min for 5 min to remove the supernatant, drying the precipitates at 37° C. to a moisture content below 14% milling and sieving with a 80-mesh sieve, and mixing uniformly with flour in a mixing machine to obtain whole-wheat flour, which has a bran speck content of 12%, a particle size distribution D50 of 28.32, a gluten index of 66, and a damaged starch content of 12%. Wherein the whole-wheat flour only ultrafinely pulverized has a bran speck content of 24%, a particle size distribution D50 of 36.88, a gluten index of 54, and a damaged starch content of 29%. The comparison of data is shown in FIG. 1.

The above examples are preferred embodiments of the present invention; however, the embodiments of the present invention are not limited thereto. For example, the polysaccharide colloids according to the present invention can also be acacia, xanthan gum or other polysaccharide colloids; and the cereal can be cereals such as oats, wheat, corn, rice, barley, rye, sorghum, black wheat, sweet buckwheat or tartary buckwheat and the like. Any other alteration, modification, substitution, combination and simplification made without departing from the spiritual essence and principle of the present invention are equivalent replacements and fall within the scope of protection of the present invention.

The invention claimed is:

1. A method for producing whole-cereal flour by means of pulsed electric fields in collaboration with ultrafine pulverization, the method comprising:
    (1) preparing bran, middling and flour by cleaning and milling cereal grains;
    (2) performing ultrafine pulverization on the bran and the middling, and sieving the pulverized bran and middling by a 60-mesh sieve;
    (3) preparing a 20-30% suspension containing water and the sieved bran and middling, and stirring to keep the suspension uniform;
    (4) adding polysaccharide colloids into the suspension in an amount of 0.2-0.5% by mass of the suspension, and adjusting the pH to 4.0-5.5;
    (5) treating placing the suspension obtained in step (4) by high-voltage pulse with an electric field intensity of 10-50 kV/cm in a processing chamber of a clean high-voltage pulse processing device, the suspension being a steady flow in the processing chamber;
    (6) centrifuging the suspension after step (5) to separate a supernatant, and drying the resulting precipitates at 30-37° C. to a moisture content below 14% and performing sieving to obtain treated bran and middling; and
    (7) mixing the treated bran and middling obtained in step (6) with the flour obtained in step (1) to obtain the whole-cereal flour.

2. The method according to claim 1, wherein the polysaccharide colloids of step (4) comprise gum acacia, konjac gum, carrageenan, xanthan gum, or pectin.

3. The method according to claim 1, wherein the high-voltage pulse treatment in step (5) comprises a pulse frequency of 500-1500 Hz, a pulse width of 20-40 µs, a suspension flow rate of 300-600 L/h, and a pulse treatment time of 70-550 µs.

4. The method according to claim 1, wherein the cleaning in step (1) comprises sieving, removing stone, magnetic separation, winnowing, threshing, or any combination thereof.

5. The method according to claim 1, wherein the sieving in step (6) is done by a 80-mesh sieve.

6. The method according to claim 1, wherein the centrifuging in step (6) is centrifuging for 5-15 min at 3000-5000 r/min.

7. The method according to claim 1, wherein the high-voltage pulse treatment in step (5) comprises a pulse frequency of 500-1500 Hz.

8. The method according to claim 1, wherein the high-voltage pulse treatment in step (5) comprises a pulse width of 20-40 µs.

9. The method according to claim 1, wherein the high-voltage pulse treatment in step (5) comprises a suspension flow rate of 300-600 L/h.

10. The method according to claim 1, wherein the high voltage pulse treatment in step (5) comprises a pulse treatment time of 70-550 µs.

* * * * *

UNITED STATES PATENT AND TRADEMARK OFFICE
CERTIFICATE OF CORRECTION

PATENT NO. : 10,785,983 B2
APPLICATION NO. : 15/755162
DATED : September 29, 2020
INVENTOR(S) : Xin'an Zeng Page 1 of 1

It is certified that error appears in the above-identified patent and that said Letters Patent is hereby corrected as shown below:

In the Specification

Column 1, Line 10, Delete "The application" and insert -- This application --

In the Claims

Column 6, Line 7, Claim 1, after "treating" delete "placing"

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*